United States Patent [19]

Thompson

[11] 4,009,620

[45] Mar. 1, 1977

[54] DRIVE BELT

[75] Inventor: Lawrence M. Thompson, Lancaster, Pa.

[73] Assignee: The Arbee Corporation, Manheim, Pa.

[22] Filed: Sept. 25, 1975

[21] Appl. No.: 616,768

[52] U.S. Cl. .................................. 74/236; 156/139
[51] Int. Cl.² ...................... F16G 51/80; B29H 7/22
[58] Field of Search ........ 74/236, 235, 234, 231 R, 74/231 P; 156/137, 139

[56] References Cited
UNITED STATES PATENTS

| | | | |
|---|---|---|---|
| 2,756,604 | 7/1956 | Wiker, Jr. ........................ | 74/236 X |
| 2,969,686 | 1/1961 | Runton ............................. | 74/236 |
| 3,375,726 | 4/1968 | Jones et al. ....................... | 74/236 X |

*Primary Examiner*—Leonard H. Gerin
*Attorney, Agent, or Firm*—Dorfman, Herrell and Skillman

[57] ABSTRACT

A drive belt comprising a series of links arranged in superimposed successive overlapping relation secured together by fasteners and composed of a homogeneous material devoid of fibrous reinforcement. The links are made of Hytrel, an E. I. duPont de Nemours & Co. segmented thermoplastic copolyester.

5 Claims, 4 Drawing Figures

FIG. 1
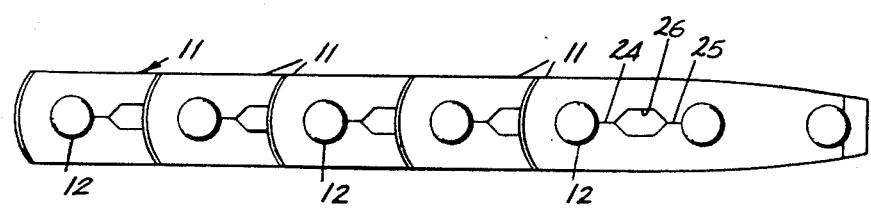
FIG. 2
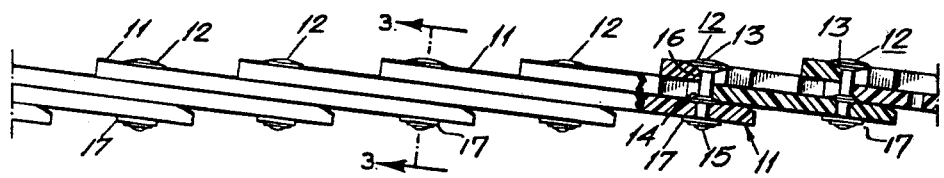
FIG. 3
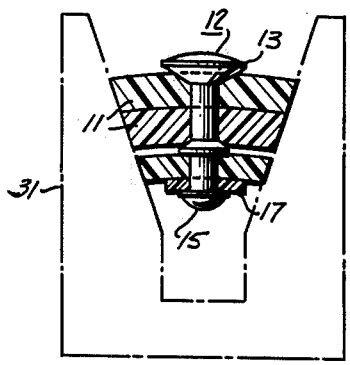
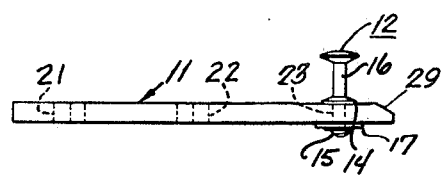
FIG. 4

DRIVE BELT

The present invention relates to driving belts for use both for power transmission and for conveying and, more particularly, to driving belts of the type comprising a number of superimposed links secured together by suitable fastening means which pass through openings formed in the links.

The present invention has particular application to V-belts for use in environments where the belts are subjected to severe conditions of heat and moisture during their operation, and specifically washing apparatus where the belts are exposed to water, dirt, grease and the like, such, for example, as poultry processing apparatus of the type used for removing the feathers from the poultry.

In poultry defeathering apparatus, the poultry is passed between plucking wheels having a plurality of flexible fingers which wipe against the feathers of the poultry and separate the feathers from the body. To facilitate the separation, the poultry is subjected to baths or sprays of water which soak the feathers to facilitate removal. It has been found desirable to drive the plucking wheels individually so as to facilitate proper engagement of the wheels with the body of the poultry and insure removal of the feathers effectively. Because of the plurality of individual drives required, the drive means are positioned within the housing of the apparatus so that the drive means are subjected to the harsh atmospheric conditions within the apparatus housing, including the elevated temperature and moisture conditions which are desirable to enhance the removal of the feathers.

In such apparatus, it has been found particularly desirable to use link-type V-belts of the stated type to drive the individual plucking wheels so that repair and replacement of the individual drive for each wheel is facilitated. Thus, in the event of the failure of a belt driving an individual plucking wheel, it is possible to repair and replace the belt by disconnecting the fasteners for one link and to permit removal of the belt for repair and re-engagement of the fasteners when the belt has been repaired and placed in position in the housing. By using a plurality of link-type V-belts, the various drives may originate from a common drive source and the individual belts may be replaced without affecting the adjustment of the remaining belts.

Prior link belts of this character have not been entirely satisfactory for use in the hot and moist atmosphere within a chicken plucking apparatus because of the fact that the links of such belts are normally composed of a multi-ply fabric laminated structure whose integrity is maintained by a suitable bonding agent permeating the laminated structure. Links of this character have been proved highly successful for use in normal operating environments but in the hot and moist environment of poultry processing apparatus, there is a tendency for the plies of the links to separate and there is a relatively short operating life for such belts.

Furthermore, the conventional fiber-reinforced links, when they become wet, tend to swell and stretch, which affects the tension in the belt. The use of link belts in a wet environment is not normally recommended.

Previous attempts to improve the life spanof link-type belts operating under extreme conditions have been directed toward improving the material in the laminated structures, such as the fabric component of the structure and the bonding material used to integrate the plies of the structure into a unitary link. Previous attempts to find a suitable substitute for the multi-ply fabric laminated structures have met with failure.

With the foregoing in mind, the present invention provides a novel link-type driving belt which has been discovered to have an extended life in use which is substantially longer than the life of belts using standard material.

The drive belt of the present invention is comprised of links which may be fabricated using standard simplified molded techniques and which may be assembled in the factory or in the field to provide a belt of high durability.

The belt uses links fabricated from a homogeneous material devoid of fibrous reinforcement material.

All of the objects of the present invention and the various features and details of the construction and operation thereof are more fully set forth hereinafter and described with reference to the accompanying drawing, in which:

FIG. 1 is a plan view of a length of drive belting embodying the present invention;

FIG. 2 is a side elevation view of the belt shown in FIG. 1 with portions broken away to show details of the construction of the belt;

FIG. 3 is a transverse sectional view taken on the line 3—3 of FIG. 2 showing a sheave in broken lines to illustrate the operation of the belt; and FIG. 4 is a side elevational view of a link of the belt showing a fastener mounted therein.

Referring now to the drawings, and more particularly to FIGS. 1 and 2 thereof, the belt comprises a plurality of superimposed links 11 held together by studs or fasteners 12 each having an outer head 13, a shoulder 14 and an inner head 15, mounted on a shank 16. The outer head 13 and the shoulder 14 are spaced apart a distance to receive therebetween two thicknesses of the links 11, and, as shown in FIG. 2, the shoulder 14 is spaced from the head 15 to receive therebetween a single thickness of link 11. A wear washer 17 is mounted between the inner head 15 and the under surface of the inner link 11.

The links 11 are provided with registering apertures for receiving the shanks 16 of the studs 12. As shown in FIG. 4, the links are provided with a forward aperture 21, an intermediate aperture 22 and a trailing aperture 23. When the links are assembled in superimposed relation, the trailing aperture 23 is in registry with the intermediate aperture 22 of the upwardly adjacent link and the intermediate aperture 22 is in registry with the forward aperture 21 of the upwardly adjacent link, so that each stud passes through the aperture 23 of the innermost link, the aperture 22 of the intermediate link and the aperture 21 of the outermost link. For ease of assembly, the apertures 21 and 22 are interconnected by slits 24 and 25 and a central enlarged opening 26. As shown, the trailing edge of the link is bevelled on its upper side as indicated at 29 to provide increased flexibility of the belt as it is trained above the pulley or sheave.

The links 11 are fabricated from homogeneous material which is devoid of fibrous reinforcement material. The elimination of the fibrous reinforcement, which has been characteristic of commercially-available belt links of the prior art, is believed to contribute to the durability and operational life of the drive belts of the present invention. As stated above, the drive belts of the present invention are designed for use in an environment where conventional commercially-available link belts are not entirely satisfactory. In a particular application, the drive belt of the present invention is used in a chicken plucking apparatus in which the drive belt itself is subjected not only to moisture and heat, for example water at 120° F, but also to feathers, dirt, and poultry fat which are present in the defeathering apparatus. Drive belts are used with V-pulleys and the operation of the drive belts subjects them to a wide variety of stresses and strains. Elimination of the fibrous reinforcement material from the links 21 is believed to permit the use of a material which is highly resistant to the damage from the severe conditions within the apparatus.

The present invention provides a link belt of homogeneous material devoid of fibrous reinforcement, and it has been found that the homogeneous material must comprise segmented thermoplastic copolyesters containing recurring long chain ester units derived from dicarboxylic acids and long chain glycols and short chain ester units derived from dicarboxylic acid and low molecular weight diols. The composition is a thermoplastic polyester elastomer which is commercially available from E.I. duPont de Nemours & Co., Inc., under the registered trademark "Hytrel" and is described in U.S. Pat. Nos. 3,651,014, 3,763,109 and 3,766,146.

It has been discovered that in fabricating a link of the type shown in the drawing for use in a link belt having metallic fasteners passing through successive apertures in succeeding links, a segmented thermoplastic copolyester of the type set forth should have a durometer above 40D(92A) and less than 72D. The preferred durometer has been found to be approximately 55D for use in link belts having metallic fasteners as shown in the drawings.

Drive belts made in accordance with the invention are particularly suited for use in wet processing apparatus where the belt is exposed to hot water. The links of the present invention resist retention of moisture and thereby retain their dimensional stability whether wet or dry. The belt is particularly adapted for use in a defeathering machine of the type illustrated in the Brown et al. U.S. Pat. No. 3,402,424, wherein the plucking fingers are driven by V sheaves inclined to the horizontal. Where a V-belt is running in an inclined orientation, it is highly sensitive to variations in tension, and slack in the belt tends to permit disengagement from the sheave. The present invention provides a belt resistant to stretching and thereby tends to preserve the proper tension in the V-belts so as to reduce the tendency of the belts to disengage from their pulleys.

While a particular embodiment of the present invention has been herein illustrated and described, it is not intended to limit the invention to such disclosure but changes and modifications may be made therein and thereto within the scope of the following claims.

I claim:

1. A drive belt comprising a series of links arranged in superimposed successive overlapping relation, each of said links having apertures at the forward, intermediate and trailing portions of the link, fastening means extending through the apertures in the overlapping portions of the link and having means at the opposite end thereof engaging the innermost and outermost links to secure said plurality of links together, said links comprising a homogeneous material devoid of fibrous reinforcement and consisting of a segmented thermoplastic copolyester containing long chain ester units derived from dicarboxylic acids and long chain glycols and short chain ester units derived from dicarboxylic acid and low molecular weight diols, and having a durometer higher than 40D(92A) and lower than 72D.

2. A drive belt according to claim 1 wherein the fastening means comprises a stud engaging at least three links, each stud having a shank passing through the forward aperture of the outermost link, the intermediate aperture of the intermediate link and the trailing aperture of the innermost link.

3. A drive belt according to claim 2 wherein said stud has a shoulder projecting outwardly from said shank between said intermediate link and the innermost link, an outer head portion engaging the outside of said outermost link, and an inner head portion bearing against the inside of the innermost link.

4. A drive belt according to claim 3 wherein said homogeneous material has a durometer of 55D.

5. A drive belt according to claim 4 including a wear washer between said inner head portion and said innermost link whereby said link is confined between said shoulder and said wear washer.

* * * * *